US010022884B1

(12) United States Patent
Cloutier (10) Patent No.: US 10,022,884 B1
(45) Date of Patent: Jul. 17, 2018

(54) SYSTEMS AND METHODS FOR ALIGNMENT TECHNIQUES FOR MAGNETIC CARDS AND DEVICES

(75) Inventor: Bruce S. Cloutier, Jeannette, PA (US)

(73) Assignee: DYNAMICS INC., Pittsburgh, PA (US)

(*) Notice: Subject to any disclaimer, the term of this patent is extended or adjusted under 35 U.S.C. 154(b) by 0 days.

(21) Appl. No.: 13/272,436

(22) Filed: Oct. 13, 2011
(Under 37 CFR 1.47)

Related U.S. Application Data

(60) Provisional application No. 61/393,511, filed on Oct. 15, 2010.

(51) Int. Cl.
*B26D 7/27* (2006.01)
*B32B 38/04* (2006.01)
*B26D 5/00* (2006.01)
*B26D 5/34* (2006.01)
*B29C 65/74* (2006.01)
(Continued)

(52) U.S. Cl.
CPC ............... *B26D 7/27* (2013.01); *B26D 5/005* (2013.01); *B26D 5/007* (2013.01); *B26D 5/30* (2013.01); *B26D 5/32* (2013.01); *B26D 5/34* (2013.01); *B26D 5/36* (2013.01); *B29C 65/74* (2013.01); *B29C 66/90* (2013.01); *B32B 38/0004* (2013.01); *B32B 38/185* (2013.01); *B32B 38/1833* (2013.01); *B32B 41/00* (2013.01); *Y10T 156/108* (2015.01); *Y10T 156/1052* (2015.01); *Y10T 156/1056* (2015.01); *Y10T 156/1057* (2015.01); *Y10T 156/1089* (2015.01); *Y10T 156/1092* (2015.01); *Y10T 156/1093* (2015.01); *Y10T 156/1097* (2015.01)

(58) Field of Classification Search
CPC ...... B29C 2793/0027; B29C 2795/002; B29C 2791/002; B26D 7/27; B26D 2007/0068; B26D 5/005; B26D 5/007; B26D 5/30; B26D 5/32; B26D 5/34; B26D 5/36; B32B 38/0004; B32B 2038/045; B32B 41/00; B32B 2041/04
USPC ......... 156/267, 270, 299, 353; 428/611, 905
See application file for complete search history.

(56) References Cited

U.S. PATENT DOCUMENTS 3,711,353 A * 1/1973 Zimmer ..................... 156/267
4,051,484 A * 9/1977 Martin ................... G06K 1/121
101/225
(Continued)

FOREIGN PATENT DOCUMENTS

DE 102007042470 * 3/2009 ............. C08J 11/00
EP 0578992 A2 * 6/1993 ............. B32B 38/10
(Continued)

OTHER PUBLICATIONS

U.S. Appl. No. 60/594,300, Poidomani et al.
(Continued)

*Primary Examiner* — Linda L Gray (57) ABSTRACT

Cards may be populated with components and alignment cues. A fully populated card may then be laminated using either of a clear (e.g., transparent) laminate or an obscure (e.g., opaque) laminate. Visual and/or non-visual alignment cues within a card may be utilized to align a trimming and/or singulation device to the card. The card may be singulated and/or trimmed with the aligned singulation and/or trimming device to position one or more components of the card.

19 Claims, 6 Drawing Sheets

(51) Int. Cl.
  *B26D 5/32* (2006.01)
  *B32B 38/18* (2006.01)
  *B26D 5/30* (2006.01)
  *B32B 41/00* (2006.01)
  *B29C 65/00* (2006.01)
  *B26D 5/36* (2006.01)
  *B32B 38/00* (2006.01)

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,358,353 B1 * | 3/2002 | Maliner ............ B65C 9/44 156/256 |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |

(56) References Cited

U.S. PATENT DOCUMENTS

| | | |
|---|---|---|
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0065138 A1* | 3/2009 | Engel et al. ............... 156/273.3 |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159700 A1 | 6/2009 | Mullen |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| JP | 05210770 A | 8/1993 |
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.perdue.edu/~jtli/paper/fc07.pdf. As viewed on Apr. 12, 2010.
English translation of JP 05210770 A.

* cited by examiner

SYSTEMS AND METHODS FOR ALIGNMENT TECHNIQUES FOR MAGNETIC CARDS AND DEVICES

CROSS-REFERENCE TO RELATED APPLICATION

This application claims the benefit of U.S. Provisional Patent Application No. 61/393,511, titled "SYSTEMS AND METHODS FOR ALIGNMENT TECHNIQUES FOR MAGNETIC CARDS AND DEVICES," filed Oct. 15, 2010, which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID reader and the RFID included on the card.

A card may include multiple buttons and each button may be associated with a different product or feature. Alternatively, for example, a card may include a single button, but that single button may be used to, for example, toggle between multiple products. For example, pressing a button on a card a first time may cause a first payment product to be communicated via a dynamic magnetic stripe communications device. Pressing that button on that card a second time may, however, cause a second payment product to be communicated via that dynamic magnetic stripe communications device. Accordingly, a user may utilize a single button to toggle between multiple payment products. Such payment products may include a debit product, credit product, gift product, pre-paid product, or any other type of product. For example, a card may include two credit accounts, where each credit account may be associated with a different association (e.g., Discover, MasterCard, Visa, American Express) or each credit account may be associated with the same association.

A card may be assembled as a combination of two or more circuit boards. A dynamic magnetic stripe communications device, for example, may be fabricated and assembled on a first circuit board while a second circuit board may be fabricated and assembled having other circuitry. For example, a card's processor, dynamic magnetic communications device driver circuitry, user interfaces, read-head detectors, light emitting devices, displays, batteries, and any other type of sensor, device, or associated circuitry may be fabricated on one or more other circuit boards.

A dynamic magnetic communications device may be fabricated on a flexible circuit board, for example, by providing a multiple layer flexible board (e.g., a two layer flexible printed circuit board). A coil for each track of information may be provided by including wire segments on each layer and interconnecting these wire segments through layer interconnections to create a coil. For example, a dynamic magnetic communications device may include two coils such that two tracks of information may be communicated to two different read-heads included in a read-head housing of a magnetic stripe reader. A dynamic magnetic communications device may include three coils such that three tracks of information may be communicated serially to three different read-heads included in a read-head housing of a magnetic stripe reader.

In manufacturing multiple boards dedicated to particular functions, functionality and reliability of each board may be verified separately before assembling. Once verified, one or more of the circuit boards may be mechanically and/or electrically coupled together via, for example, epoxy or conductive tape to form, for example, an electronics package. Such an electronics package may also include a dynamic magnetic communications device.

The electronics package may then be laminated to form a final card assembly. Such a lamination may occur, for example, in an injection molding process (e.g., a reaction injection molding process). A laminate may be, for example, a silicon-based material or a polyurethane-based material. The laminated card may then be provided to a personalization facility for personalization. During personalization, for example, a customer's personal data may be placed on the exterior of the card (e.g., printed, embossed, or laser etched) as well as programmed into a processor's memory of the card.

The process that may be used to laminate a card assembly (e.g., an injection molding process) may yield a final card assembly having non-conforming dimensions. Accordingly, a laminated card assembly may require a trimming process, such that geometric dimensions of the trimmed card assembly may meet predetermined physical characteristics.

Alignment cues may be integrated within the card assembly to align such a trimming process. Accordingly, trimming equipment may be aligned to such alignment cues to precisely define the physical dimensions of the trimmed card.

Alignment cues may be utilized to align one or more components of the card assembly (e.g., the one or more tracks of a dynamic magnetic communications device). In so doing, the one or more tracks of a dynamic magnetic communications device may be precisely aligned with one or more dimensions of the card assembly. Once all components of the final card assembly are aligned, placed, and laminated, alignment cues may be used to trim the final card assembly.

Automated processes may be utilized to manufacture card assemblies in large quantities. For example, a pick-and-place machine may be utilized to place one or more electronics packages onto a sheet of material such that once placed, a single sheet may contain multiple (e.g., 16) card assemblies. A dynamic magnetic communications device may be one of the electronics packages that may be placed onto each card assembly by a pick-and-place machine. One or more alignment cues may be utilized by the pick-and-place machine to obtain precise alignment of each electronics package.

A second sheet may be laminated over the sheet of card assemblies to form a continuous sheet of card assemblies, such that both sides of the sheet of card assemblies may be laminated. The continuous sheet of card assemblies may be singulated into individual cards via an automated singulation process. Alignment cues, for example, may be implemented within one or more of the card assemblies to align a singulation machine that may be operating during the automated singulation process. Accordingly, each individual card may be singulated from the sheet of card assemblies and may possess correct physical dimensions.

At least one alignment cue, for example, may be implemented within a sheet of card assemblies. In so doing, an automated singulation machine may train onto the single alignment cue to obtain one or more alignment coordinates that may be necessary to accurately singulate one or more of the card assemblies from the sheet of card assemblies.

An alignment cue, for example, may be implemented as a visual alignment cue, whereby optical indicia, such as notches and tick marks, may be implemented to aid alignment. An alignment cue, for example, may be implemented as a non-visual cue, whereby other indicia, such as electronic and/or magnetic signals, may be implemented to aid alignment.

Such non-visual cues may be required, for example, during singulation and/or trimming of one or more card assemblies that may be laminated with non-transparent laminate material (e.g., opaque laminate material). In so doing, singulation and/or trimming equipment may train onto the non-visual cues to effect accurate singulation and/or trimming processes without the need to optically train onto a visual cue.

Non-visual cues, for example, may be implemented during one or more assembly stages of a card assembly. For example, a magnetic material may be placed within a card assembly at any stage of the assembly process, such that the magnetic material may provide a magnetic alignment cue that may be detected and used to align, locate and/or place components for any remaining assembly processes. In addition, a magnetic alignment cue may be detected and used to align any trimming and/or singulation processes that may be performed after the assembly process is complete.

Electronic cues (e.g., RFID tags) may also be used as alignment cues. For example, an RFID tag may communicate positions of individual electronics packages on a particular card assembly. RFID tags, for example, may communicate alignment cues that may be indicative of positions of one or more card assemblies that may exist on a sheet of card assemblies. Accordingly, pick-and-place machines and/or singulation machines may receive the alignment cues communicated by such RFID tags and may perform their respective procedures in accordance with alignment coordinates received from the RFID tags.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
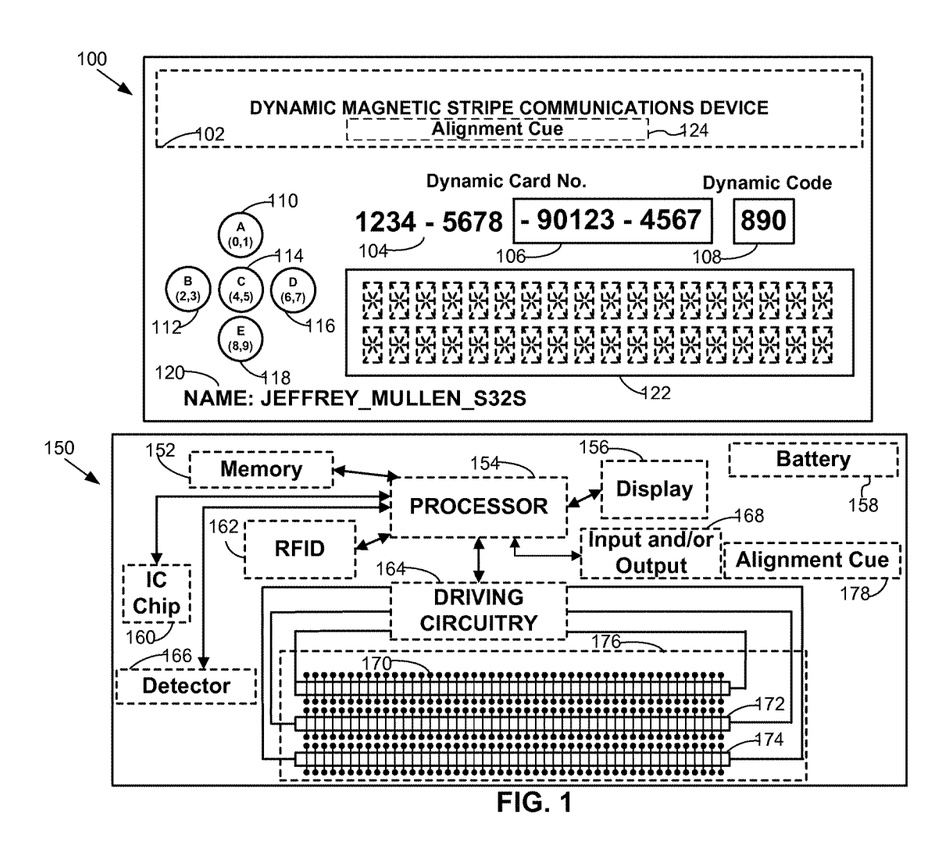
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

Dynamic magnetic stripe communications device 102 may, for example, provide one, two and/or three tracks of magnetic stripe data upon receiving data input from one or more buttons 110-118 (e.g., magnetic stripe data may be communicated after detection of a housing of a magnetic stripe reader and after receiving data input from a button). Dynamic magnetic stripe communications device 102 may, for example, include alignment cue 124 that may provide alignment information for placement of one or more components of card 100. Alignment cue 124 may, for example, provide magnetic information for placement of one or more components of card 100.

FIG. 1 shows architecture 150, which may include one or more processors 154. One or more processors 154 may be configured to utilize external memory 152, internal memory of processor 154, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes.

One or more displays 156 may be, for example, touch sensitive and/or proximity sensitive. For example, objects such as fingers, pointing devices, etc., may be brought into contact with displays 156 and/or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included within architecture 150, that can communicate information with a chip reader (e.g., an EMV chip reader). Radio frequency identification (RFID) module 162 may be included within architecture 150 to enable the exchange of information with an RFID reader.

Other input and/or output devices 168 may be included within architecture 150, for example, to provide any number of input and/or output capabilities. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

Electromagnetic field generators 170-174 may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Materials may be placed inside and/or outside of the coils of magnetic field generators 170, 172, and/or 174, for example, and such materials may provide alignment cue 178. Accordingly, automated machinery such as a pick-and-place machine, a trimming machine, and/or a singulation machine may detect alignment cue 178 to determine a substantially precise placement of the components of a card (e.g., dynamic magnetic stripe communications device 102 of card 100 of FIG. 1). In addition, relative positions of other components of a card and/or the relative position of one or more sides of a card may determined from alignment cue 178.

RFID module 162 may communicate alignment information. For example, RFID module 162 may communicate a position of one or more components of a card (e.g., card 100 of FIG. 1) to a machine that may be used during the assembly of the card. Accordingly, a subsequent trimming and/or singulation process may establish, for example, a position of electromagnetic field generators 170-174 relative to one or more sides of a card after a trimming and/or singulation process completes. For example, electromagnetic field generators 170-174 may be substantially aligned at a particular distance from the long and/or short sides of a card (e.g., card 100 of FIG. 1) after trimming and/or singulation is completed.

Other alignment cues 178 may be implemented within architecture 150. For example, notches, tick marks, and/or alignment targets, may be implemented. Accordingly, manual or automated machinery may be trained onto alignment cue 178 to allow precise placement and/or alignment of one or more components of a card.

Timing aspects of information exchange between architecture 150 and the various I/O devices implemented on architecture 150 may be determined by processor 154. One or more detectors 166 may be utilized, for example, to sense the proximity, mechanical distortion, or actual contact, of an external device, which in turn, may trigger the initiation of a communication sequence. The sensed presence or touch of the external device may then be communicated to a controller (e.g., processor 154), which in turn may direct the exchange of information between architecture 150 and the external device. The sensed presence, mechanical distortion, or touch of the external device may be effective to, for example, determine the type of device or object detected.

For example, the detection may include the detection of, for example, a read-head housing of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Figure 2:
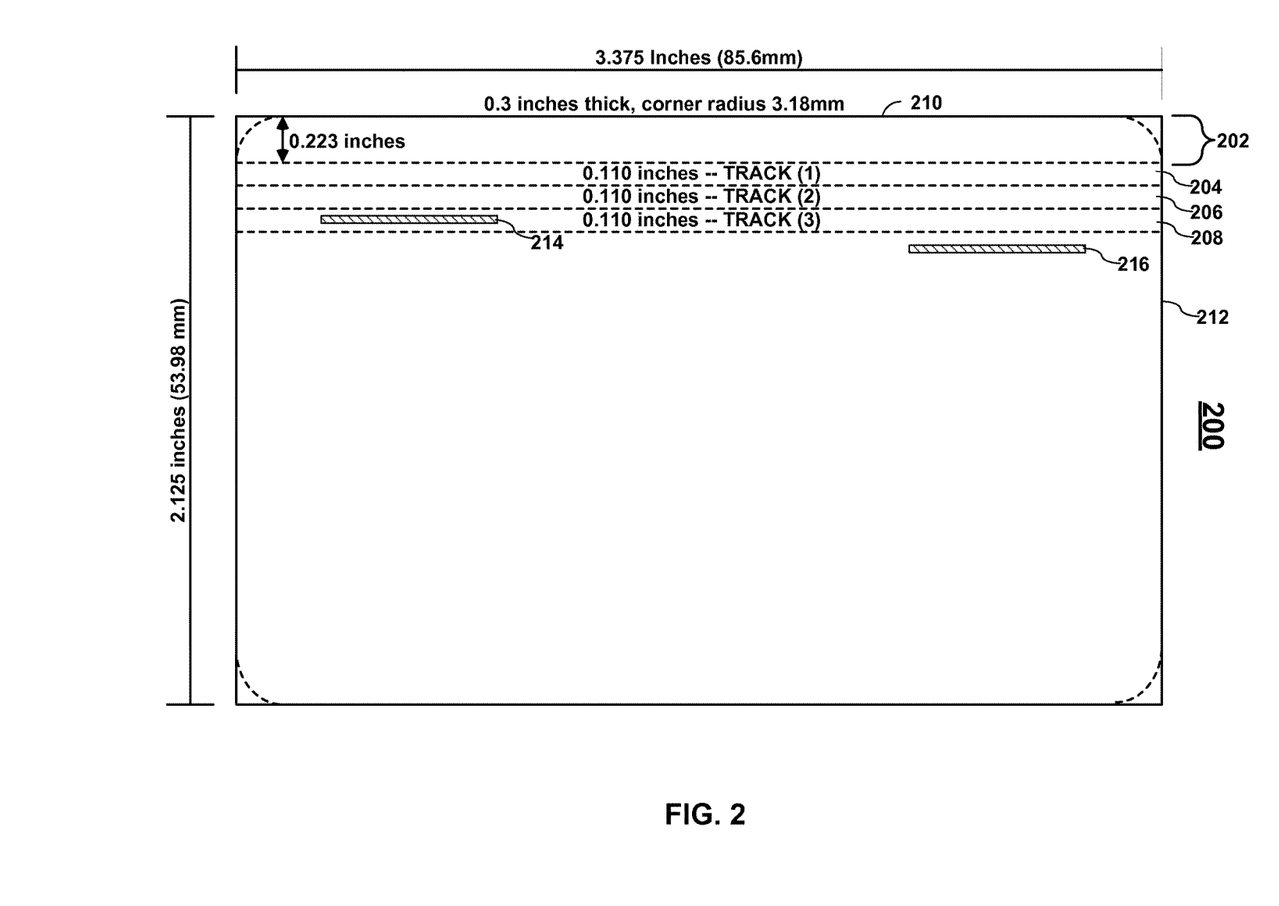
FIG. 2 is an illustration of a card constructed in accordance with the principles of the present invention.

FIG. 2 shows card 200. A distance between an edge of card 200 (e.g., edge 210) and track 1 of a magnetic stripe is substantially equal to dimension 202, which may be approximately between 0.220 and 0.225 inches (e.g., 0.223 inches). In addition, a track height may be measured along edge 212, which may be approximately between 0.109 and 0.111 inches (e.g., 0.110 inches).

Tracks 1, 2, and/or 3 may be the track locations of one or more magnetic encoders. Accordingly, a magnetic medium may be placed onto card 200 substantially in locations 204, 206, and/or 208, such that one or more magnetic encoders may change magnetic information stored within tracks 1, 2, and/or 3 of such a magnetic medium. Such changed information may then be read by a magnetic stripe reader.

Tracks 1, 2, and/or 3 may be the track locations of one or more magnetic emulators. Accordingly, a magnetic medium may not be placed onto card 200. Rather, one or more coils of such magnetic emulators may be placed substantially at locations 204, 206, and/or 208. In so doing, such magnetic emulators may generate electromagnetic fields that may communicate data to a read-head of a magnetic stripe reader.

One or more materials 214 may, for example, be placed within one or more track locations 204-208. One or more materials 216 may, for example, be placed outside one or more track locations 204-208. Materials 214 and 216 may, for example, provide alignment cues to establish a distance (e.g., distance 202) that may define a location of one or more tracks 204-208 relative to a side of card 200 (e.g., side 210). Materials 214 and 216 may, for example, be magnetic or non-magnetic materials.

Figure 3:
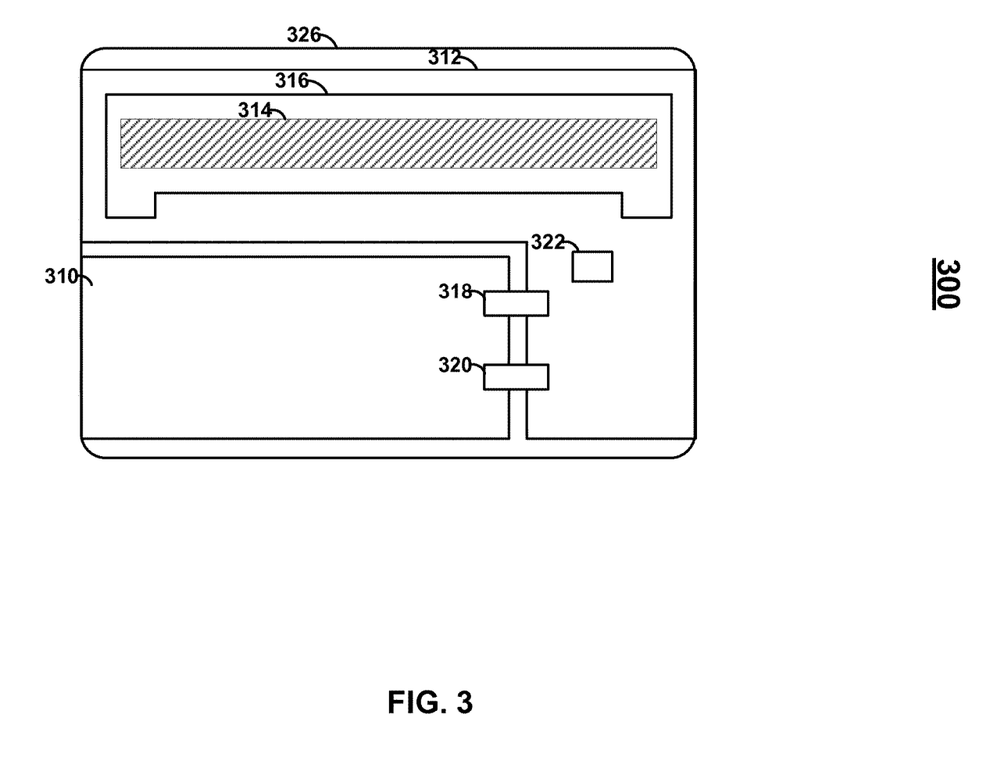
FIG. 3 is an illustration of a card constructed in accordance with the principles of the present invention.

FIG. 3 shows card 300 that may include, for example, board 312, board 316, permanent magnet 314, RFID 322, board 310, and conductive leads 318 and 320. Board 316 may include, for example, two or three coils. Each coil may have material inside the coil (e.g., a magnetic or non-magnetic material). Permanent magnet 314 may be placed across all such coils. Alternately, multiple magnets may be provided, for example, where each magnet may be positioned over a coil.

Additional circuitry may be provided on board 310 and/or board 312. For example, a processor, a battery, a display, a display driver, driver circuitry for a dynamic magnetic stripe communications device, light emitting diodes, light sensors, infrared sensors and transmitters, capacitive sensing contacts, and any type of button may be provided.

All boards, circuitry, and other components of card 300 may be laminated to form card assembly 326. Card assembly 326 may, for example, require trimming. For example, card assembly 326 may be trimmed such that a dynamic magnetic stripe communications device that may be located on board 312 may exhibit a proper separation distance from an edge of card assembly 326.

Card assembly 326 may, for example, exhibit a non-transparent laminate structure, which may obscure an optical verification of a position of a dynamic magnetic stripe communications device that may be located on card assembly 326. A magnetic field that may be produced, for example, by hard magnet 314 may nevertheless be sensed by a trimming device. Accordingly, card assembly 326 may first be properly aligned to such a magnetic field and then trimmed in accordance with such an alignment to maintain a separation distance between an edge of card assembly 326 and a dynamic magnetic stripe communications device that may be located on card assembly 326.

RFID 322 may provide location information that may define, for example, coordinates of all components, boards, and other devices on card assembly 326. Such information may be received by a trimming device to determine relative positioning and alignment of card assembly 326 prior to trimming. Accordingly, post-trim dimensions of card assembly 326 and the relative positioning of components (e.g., a dynamic magnetic stripe communications device) on card assembly 326 may be held within tolerances.

Figure 4:
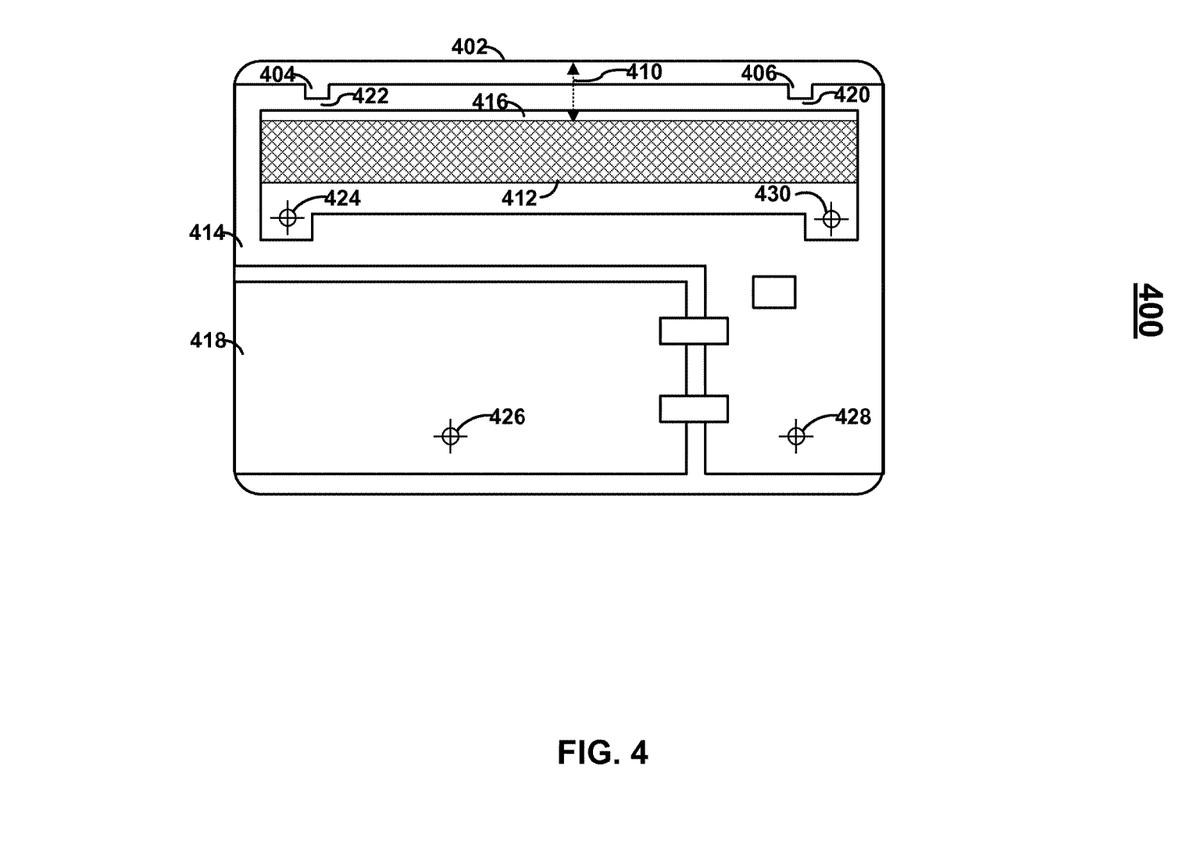
FIG. 4 is an illustration of a card constructed in accordance with the principles of the present invention.

FIG. 4 shows card 400. Card 400 may include one or more boards (e.g., boards 414, 416, and 418). Boards 414, 416, and/or 418, may contain, for example, a processor, a battery, a display, a button, and any other component that may be provided on a card. Card 400 may include dynamic magnetic stripe communications device 412. Positioning of dynamic magnetic stripe communications device 412 may be determined, such that dimension 410, for example, may be held to within tolerance.

Alignment cues (e.g., notches 404 and 406) may be provided to aid in the alignment of, for example, dynamic magnetic stripe communications device 412. For example, gaps 420 and 422 may be used to optically align board 416 onto board 414, for example, such that dynamic magnetic stripe communications device 412 exhibits a correct placement with respect to board 414.

The location of other components of card 400 may also be aligned with alignment cues 404 and/or 406. Automated alignment using, for example, a pick-and-place machine may be utilized to place one or more components onto boards 414, 416, and/or 418. In so doing, such a pick-and-place machine may align itself to alignment cues 404 and 406, where placement of the components of card 400 may be referenced to alignment cues 404 and 406 for precise placement.

Persons skilled in the art will appreciate that alignment cues 404 and 406 may provide both visual alignment cues as well as mechanical alignment cues. For example, automated machinery that may be involved with the assembly of card 400 may include protrusions that engage notches 404 and 406 to mechanically align the automated machine to card 400. Once aligned, the automated machine may place components onto card 400 using the alignment as a placement reference.

Card 400 may be laminated to form card assembly 402, such that the laminate may cover dynamic magnetic stripe communications device 412. Such a laminate may, for example, be transparent or translucent. Accordingly, an orientation of dynamic magnetic stripe communications device 412 with respect to, for example, dimension 410 may nevertheless be implemented through alignment of a trimming and/or a singulation device to cues 404 and/or 406, since cues 404 and/or 406 may remain visible despite being covered by the laminate. In so doing, the trimming and/or singulation device may optically train onto cues 404 and/or 406 so as to maintain dimension 410 within tolerance after a trimming and/or singulation process on card assembly 402 is complete.

Persons skilled in the art will appreciate that other visual cues may be implemented to aid in alignment. For example, one or more datums 424-430 may be placed onto one or more boards 414-418 to act as visual alignment cues during assembly. One or more datums 424-430, for example, may be printed (e.g., using a silkscreen) onto boards 414-418.

Figure 5:
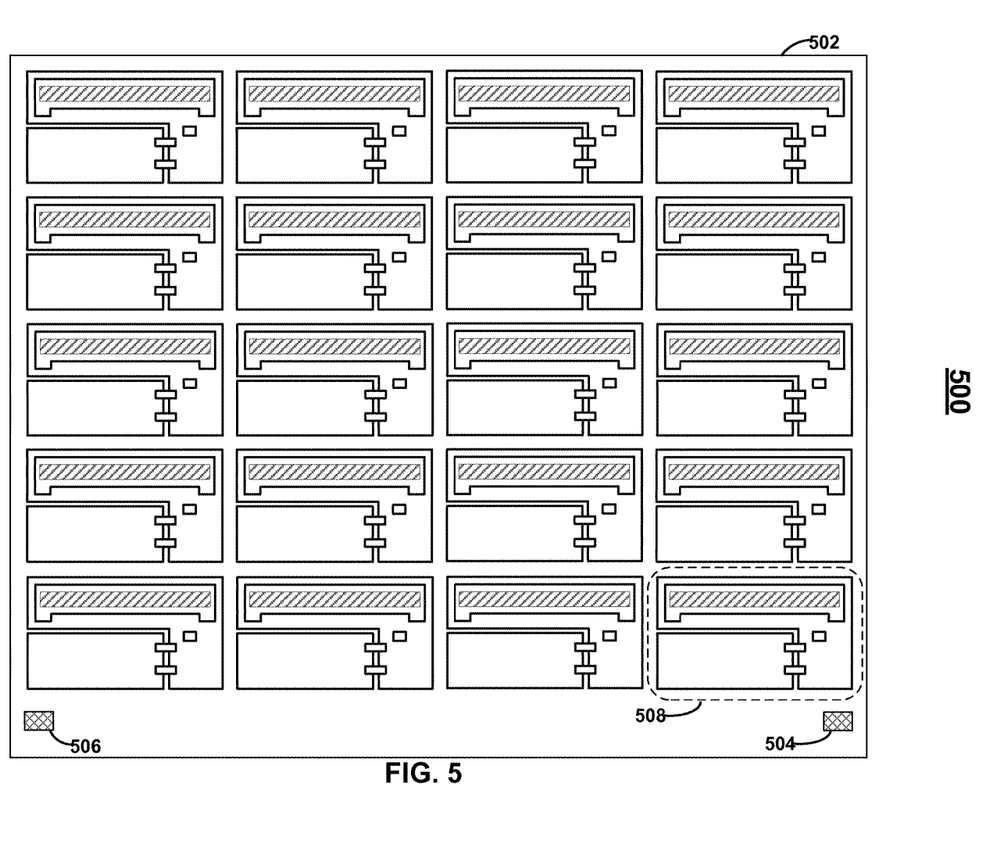
FIG. 5 is an illustration of multiple cards constructed in accordance with the principles of the present invention.

FIG. 5 shows a sheet of cards 500. Sheet assembly 502 may consist of a plurality of fully populated cards 508 that may have been placed by automated processes. For example, a pick-and-place machine may be utilized to place (e.g., simultaneously place) a plurality of electronics packages 508 onto a sheet of material. A second sheet of material may be laminated over populated cards 508 to form sheet assembly 502.

One or more alignment cues 504 and/or 506 may be implemented within sheet assembly 502 to obtain, for example, precise alignment of each electronics package 508 with respect to sheet assembly 502. For example, an automated singulation machine may train onto alignment cues 504 and/or 506 to obtain one or more alignment coordinates that may be necessary to accurately singulate each card assembly 508 from sheet assembly 502. In so doing, dimensions of each card assembly 508 singulated from sheet assembly 502 may conform to predetermined card dimensions.

Figure 6:
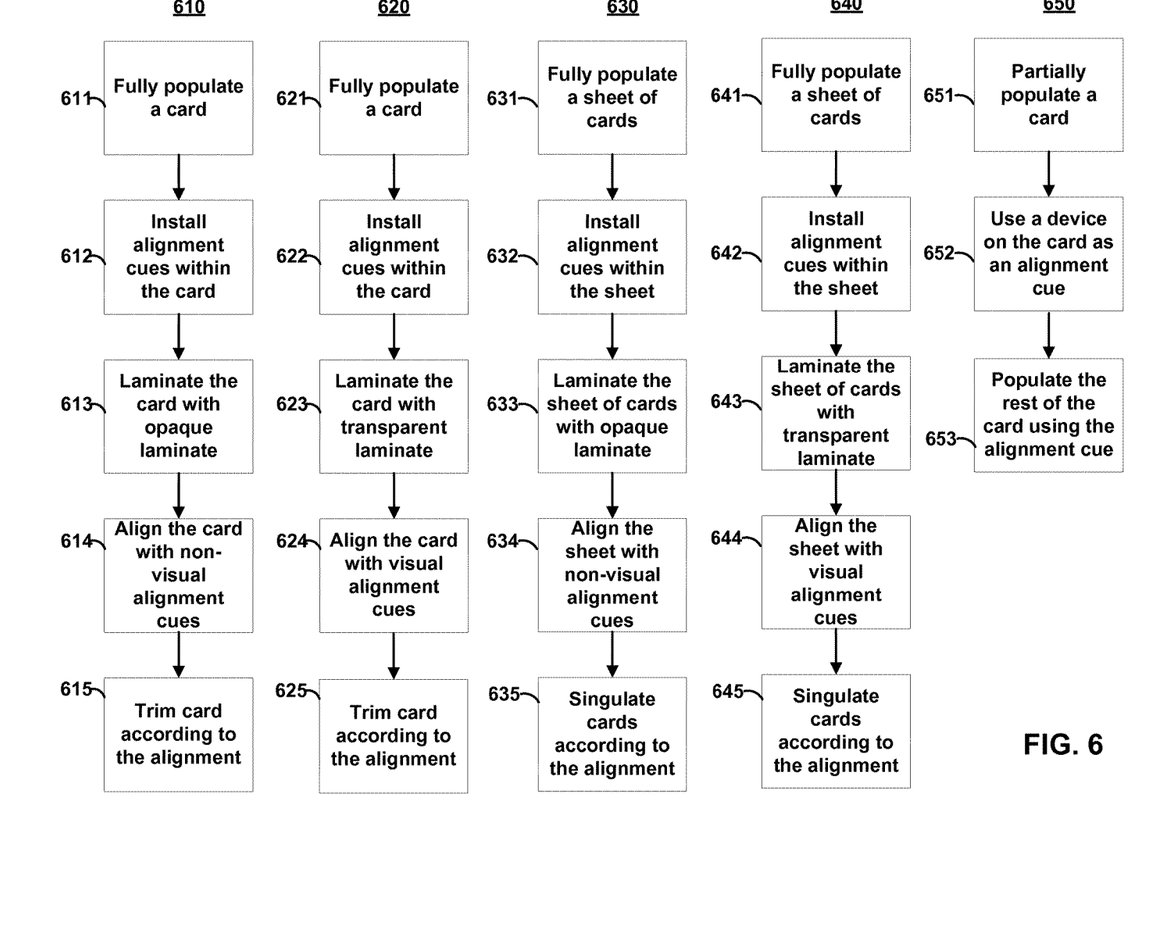
FIG. 6 is an illustration of process flow charts constructed in accordance with the principles of the present invention.

Multiple process flow charts are shown in FIG. 6. Step 611 of sequence 610 may include fully populating a card with components, such as processors, batteries, buttons, and dynamic magnetic stripe communication devices. Alignment cues may be installed within the card (e.g., as in step 612) and the fully assembled card may then be laminated with an obscure (e.g., opaque) laminate (e.g., as in step 613). The non-visual alignment cues (e.g., electronic and/or magnetic alignment cues) may be used to align the card (e.g., as in step 614) so that the card may be precisely trimmed (e.g., as in step 615).

Steps 621 and 622 of sequence 620 may include fully populating a card with components and installing alignment cues within the card. The fully assembled card may then be laminated with a clear (e.g., transparent) laminate (e.g., as in step 623). The visual alignment cues (e.g., notches and/or indicia) may be used to align the card (e.g., as in step 624) so that the card may be precisely trimmed (e.g., as in step 625).

A sheet of populated cards may be placed (e.g., simultaneously placed) to form a sheet assembly of cards (e.g., as in step 631). Alignment cues may be installed within the sheet assembly (e.g., as in step 632) and laminated with an obscure (e.g., opaque) laminate (e.g., as in step 633). The sheet assembly may be aligned with a singulation device in accordance with non-visual alignment cues (e.g., as in step 634) and then singulated to precise dimensions (e.g., as in step 635).

A plurality of populated cards may be placed to form a sheet assembly of cards (e.g., as in step 641 of sequence 640). Alignment cues may be installed within the sheet assembly (e.g., as in step 642) and laminated with a clear (e.g., transparent) laminate (e.g., as in step 643). The sheet assembly may be aligned with a singulation device in accordance with visual alignment cues (e.g., as in step 644) and then singulated to precise dimensions (e.g., as in step 645).

Step 651 of sequence 650 may include partially populating a card with one or more components (e.g., an RFID device). Alignment cues may, for example, be communicated by the device (e.g., as in step 652) to populate the remaining components at particular locations on a card (e.g., as in step 653). An alignment cue may, for example, be the location of a device, such that other devices on the card may be placed at a relative displacement from the location of the device. An alignment cue may, for example, be location information that may be communicated by the device (e.g., via an RF field of an RFID device) such that other devices on the card may be placed at locations defined by the communicated location information.

Persons skilled in the art will also appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
    populating a card with at least one alignment cue and a plurality of components to form a populated card, wherein one of said plurality of components includes a dynamic magnetic stripe communications device;
    laminating said populated card to form a laminated card;
    aligning a trimming device to said at least one alignment cue; and
    trimming said laminated card with said aligned trimming device to position said dynamic magnetic stripe communications device within a distance from a side of said card,
    wherein said laminating of said populated card includes laminating such that a portion of said trimmed card includes said at least one alignment cue.

2. The method of claim 1, wherein said at least one alignment cue is at least one material.

3. The method of claim 1, wherein said at least one alignment cue is at least one magnetic material.

4. The method of claim 1, wherein said at least one alignment cue is at least one hard magnet.

5. The method of claim 1, wherein said aligning a trimming device includes aligning said trimming device to a magnetic field.

6. The method of claim 1, wherein said at least one alignment cue is at least one notch.

7. The method of claim 1, wherein said at least one alignment cue includes at least one notch,
    said trimming device includes at least one protrusion, and
    said aligning a trimming device includes engaging said at least one notch with said at least one protrusion.

8. The method of claim 1, wherein said at least one alignment cue is at least one datum.

9. The method of claim 1, wherein said at least one alignment cue is an optical alignment cue.

10. The method of claim 1, wherein said at least one alignment cue is a non-optical alignment cue.

11. The method of claim 1, wherein said at least one alignment cue is at least one indicia.

12. The method of claim 1, wherein said at least one alignment cue is at least one tick mark.

13. The method of claim 1, wherein said at least one alignment cue is at least one alignment target.

14. The method of claim 1, wherein said aligning a trimming device includes training said trimming device onto said at least one alignment cue.

15. The method of claim 1, wherein said at least one alignment cue is a mechanical alignment cue.

16. The method of claim 1, wherein at least one of said plurality of components is a flexible printed circuit board, and said populating a card with at least one alignment cue includes printing indicia onto said flexible circuit board.

17. The method of claim 1, wherein at least one of said plurality of components is a display.

18. The method of claim 1, wherein said plurality of components includes at least a board, a processor, a battery, a display, and a button.

19. A method, comprising:

populating a card assembly with a plurality of components and at least one alignment cue to form a populated card assembly, wherein one of said plurality of components includes a dynamic magnetic stripe communications device;

laminating said populated card assembly with a laminate layer including at least one laminate material;

aligning a trimming device to said at least one alignment cue; and trimming said laminate layer with said aligned trimming device to form a trimmed laminate layer, wherein said dynamic magnetic stripe communications device is positioned at a target distance from a side of said trimmed laminate layer, and said laminating of said populated card assembly includes laminating such that a portion of said populated card assembly includes said at least one alignment cue.

* * * * *